(12) United States Patent
Englbrecht et al.

(10) Patent No.: US 7,360,787 B2
(45) Date of Patent: Apr. 22, 2008

(54) GAS GENERATOR AND METHOD FOR ASSEMBLING OF A GAS GENERATOR

(75) Inventors: Karl Englbrecht, Erharting (DE); Thomas Kapfelsperger, Mühldorf (DE); Karsten Schwuchow, Wasserburg (DE); Andreas Zauhar, Burghausen (DE)

(73) Assignee: TRW Airbag Systems GmbH, Aschau/Inn (DE)

( * ) Notice: Subject to any disclaimer, the term of this patent is extended or adjusted under 35 U.S.C. 154(b) by 343 days.

(21) Appl. No.: 10/943,117

(22) Filed: Sep. 16, 2004

(65) Prior Publication Data
US 2005/0056182 A1    Mar. 17, 2005

(30) Foreign Application Priority Data
Sep. 17, 2003    (DE) .................. 103 42 975

(51) Int. Cl.
B60R 21/26    (2006.01)
(52) U.S. Cl. ................. 280/736; 280/741
(58) Field of Classification Search ............ 280/736, 280/737, 740, 741, 742; 102/530, 531
See application file for complete search history.

(56) References Cited

U.S. PATENT DOCUMENTS

| | | | |
|---|---|---|---|
| 5,116,080 A | 5/1992 | Wipasuramonton | |
| 5,255,938 A | 10/1993 | Brede et al. | |
| 5,451,381 A * | 9/1995 | Kishimoto et al. | 422/305 |
| 5,556,131 A * | 9/1996 | Bender et al. | 280/741 |
| 5,626,360 A | 5/1997 | Lauritzen et al. | |
| 5,931,496 A | 8/1999 | Brede et al. | |
| 6,012,737 A * | 1/2000 | Van Wynsberghe et al. | 280/737 |
| 6,116,643 A * | 9/2000 | Katsuda et al. | 280/741 |
| 6,299,200 B1 * | 10/2001 | Bowers et al. | 280/730.2 |
| 6,863,303 B2 * | 3/2005 | Yamazaki et al. | 280/736 |
| 6,871,873 B2 * | 3/2005 | Quioc et al. | 280/741 |

FOREIGN PATENT DOCUMENTS

| | | |
|---|---|---|
| DE | 19507208 | 9/1996 |
| EP | 0589152 | 3/1994 |
| EP | 0728632 | 8/1996 |

* cited by examiner

Primary Examiner—Ruth Ilan
(74) Attorney, Agent, or Firm—Tarolli, Sundheim Covell & Tummino LLP

(57) ABSTRACT

A gas generator comprises an oblong outer housing and an elongated combustion chamber insert with a tubular wall arranged in the outer housing. The combustion chamber insert contains a solid propellant, has a first and a second axial end and is held in the outer housing. The tubular wall of the combustion chamber insert is fixed at both axial ends by a form fit in radial and axial direction to the outer housing.

16 Claims, 3 Drawing Sheets

GAS GENERATOR AND METHOD FOR ASSEMBLING OF A GAS GENERATOR

FIELD OF THE INVENTION

The invention relates to a gas generator and a method for its assembling.

BACKGROUND OF THE INVENTION

Gas generators are known which have an oblong housing in which a combustion chamber insert carrying a solid propellant is arranged. The fastening of the combustion chamber insert in the gas generator is to be brought about as simply and quickly as possible, for reasons of cost. At the same time, however, it must be ensured that the combustion chamber insert is held without play over the entire lifespan of the gas generator, in order for example to prevent a rattling.

BRIEF DESCRIPTION OF THE INVENTION

It is an object of the invention to propose a gas generator in which this is achieved in a simple manner.

For this, a gas generator comprises an oblong outer housing and an elongated combustion chamber insert with a tubular wall arranged in the outer housing. The combustion chamber insert contains a solid propellant, has a first and a second axial end and is held in the outer housing. The tubular wall of the combustion chamber insert is fixed at both axial ends by a form fit in radial and axial direction to the outer housing.

It is a further object of the invention to provide a method for assembling of a gas generator.

In this, a gas generator comprising an oblong outer housing and an elongated combustion chamber insert with a tubular wall containing a solid propellant having a first and a second axial end is assembled by inserting in a first step the combustion chamber insert into the outer housing and fixing the first axial end thereof by a form fit in radial and axial direction in said outer housing. The second axial end of said combustion chamber insert is deformed in a second step to provide a form fit in radial and axial direction to fix the second axial end in said outer housing.

It is not necessary to weld the combustion chamber insert for example in the outer housing, which facilitates the manufacture. Owing to the tubular wall, the length of the combustion chamber insert in axial direction can be adapted simply to various lengths of the outer housing.

Preferably, the tubular wall of the combustion chamber insert is at least partially a tube consisting of a perforated sheet. The gas formed on activation of the gas generator in the combustion chamber insert can flow off over a large area into the outer housing through the perforated sheet.

In a preferred embodiment of the invention, the wall of the combustion chamber insert is partially formed by a cap-shaped axial end piece. The cap-shaped end piece can have a cylindrical peripheral edge with through-flow openings. These through-flow openings are preferably connected with the exterior of the gas generator, so that finally the gas formed in the gas generator can flow off via the cap-shaped end piece.

The combustion chamber insert can consist of two parts, namely of the cap-shaped end piece and also of a tube piece. The cap-shaped end piece and the tube piece are preferably assembled outside the gas generator, in order to form the combustion chamber insert. To adapt to various lengths of the outer housing, only the tube piece has to be cut to the corresponding length, whereas the end piece can always be used unchanged.

To optimize the gas flow inside the gas generator, it is advantageous if the cap-shaped end piece has an axial dividing wall for delimiting a combustion chamber constructed in the combustion chamber insert. This dividing wall can form a closed surface or can have at least one overflow opening. In the first case, the entire gas which is generated from the solid propellant held in the combustion chamber, flows firstly through outflow openings in the tubular wall in the intermediate space between the inner side of the wall of the outer housing and the outer side of the tubular wall of the combustion chamber insert. From there, the gas flows off via the through-flow openings in the cap-shaped end piece out from the gas generator.

In a preferred embodiment of the invention, the first axial end of the combustion chamber insert narrows at least partially, a receptacle is provided in the outer housing which is coordinated with the geometric shape of the first axial end, and the first axial end is held and fixed in a form-fitting manner in the receptacle. The fixing can be increased by the first axial end being pressed into the receptacle.

A preferred embodiment of the invention makes provision that the second axial end of the combustion chamber insert is open and lies prestressed against an inner side of the outer housing. According to another embodiment of the invention, provision is made that the second axial end of the combustion chamber insert is open and lies prestressed against a wall of an ignition unit projecting into the interior of the gas generator, and forms a form fit with the wall. The prestressing assists the fixing of the second axial end of the combustion chamber insert both in axial and also in radial direction.

The form fit for fixing the second axial end of the combustion chamber insert can be formed by a deformation of the second axial end in the state of the combustion chamber insert inserted in the outer housing. The deformation preferably takes place only after the combustion chamber insert is fixed with the first axial end in the outer housing. To produce the form fit between the second axial end of the combustion chamber insert and the outer housing, for example the open end of the tubular wall can be deformed by a tool.

Here, at the second axial end of the combustion chamber insert, at least one bead-shaped depression can be formed, by means of which a form fit is achieved. The bead-shaped depression can completely surround the tubular wall peripherally at the second axial end, or several depressions can be provided distributed over the periphery. With the deformation of the tubular wall, it is also possible at the same time to press the bead-shaped depression(s) against the inner side of the wall of the outer housing.

In a preferred embodiment, the combustion chamber insert at its axial ends and the inner side of the outer housing converge conically to form receptacles, and the combustion chamber insert is braced axially between the receptacles in the outer housing and is held in a form-fitting manner in radial direction, the axial ends of the combustion chamber insert for example lying flat against an inner side of a section of the outer housing.

DETAILED DESCRIPTION OF PREFERRED EMBODIMENTS

Figure 1:
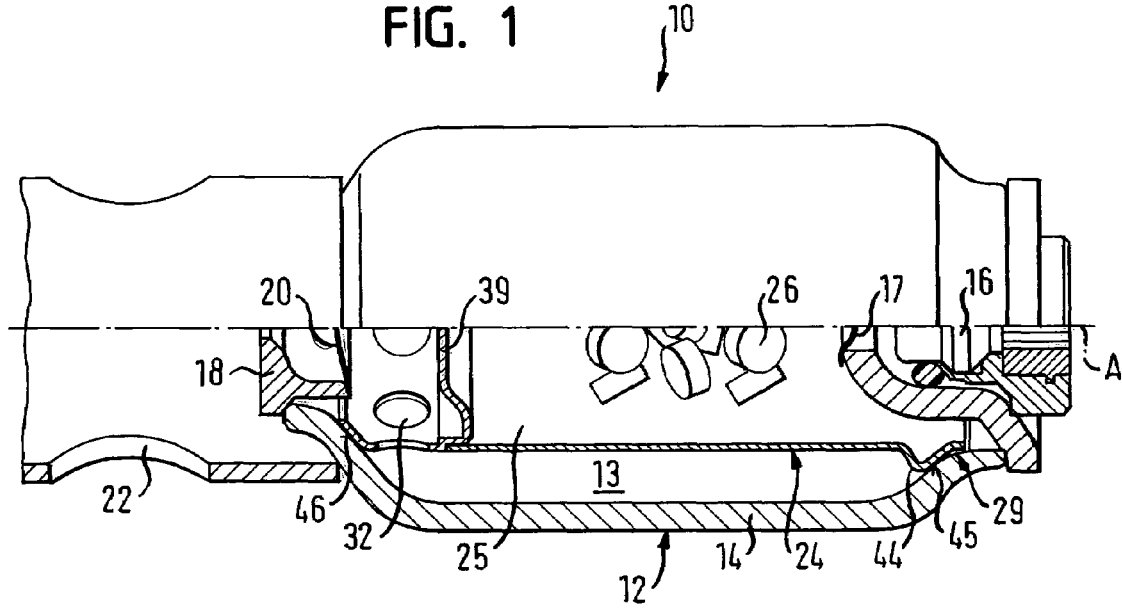
FIG. 1 shows a diagrammatic view, partially in section, of a gas generator according to the invention in accordance with a first embodiment.

In FIG. 1 a hybrid gas generator 10 is shown, with an outer housing 12, which surrounds a pressure chamber, filled with a medium 13 under pressure, e.g. a rare gas such as argon or helium. The outer housing 12 has an elongated shape and has a peripheral wall 14. The peripheral wall 14 narrows conically in axial direction A at both ends of the gas generator 10.

At an axial end of the gas generator 10, an ignition unit 16 is to be found, which is known from conventional hybrid gas generators. In the example shown here, the ignition unit 16 is closed with respect to the pressure chamber by a membrane 17, which is destroyed on activation of the ignition unit 16.

At the opposite axial end of the gas generator 10, outflow openings 22 and also a throttle device 18 and a closure membrane 20 are provided. After opening the closure membrane 20, the pressure chamber is connected via the throttle device 18 with the outflow openings 22, so that gas can escape from the gas generator 10.

Inside the outer housing 12, a combustion chamber insert 24 is held, in which a combustion chamber 25 is constructed, which contains a solid propellant 26, here in tablet form. The propellant is housed exclusively in the combustion chamber insert 24. A first axial end 28 of the combustion chamber insert 24 borders on to the throttle device 18, whilst a second axial end 29 of the combustion chamber insert 24 is arranged in the region of the ignition unit 16.

Figure 2:
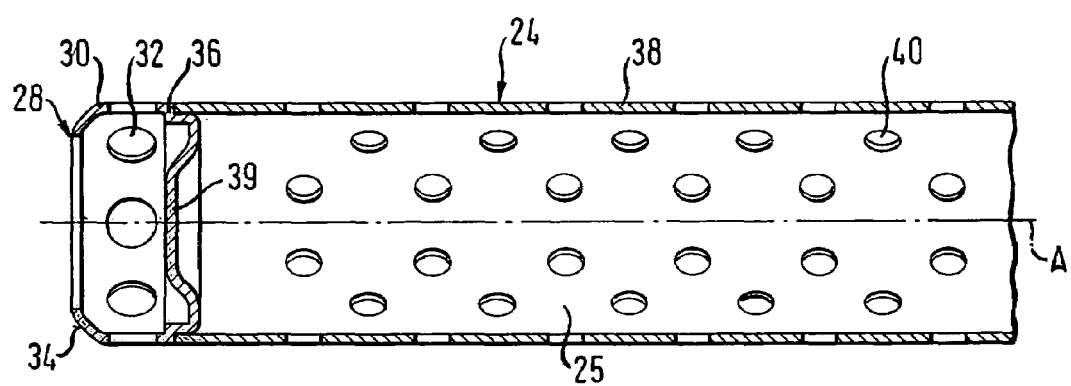
FIG. 2 shows a combustion chamber insert of a gas generator according to the invention.

The combustion chamber insert 24, which is shown in further detail in FIG. 2, consists of two parts. At the first axial end 28 there is a cap-shaped end piece 30 with a cylindrical peripheral edge provided with through-flow openings 32. The first axial end 28 is narrowed, so that it forms a chamfer 34 in the form of a frustum. At the end facing away from the first axial end 28, an encircling shoulder 36 is constructed on the cap-shaped end piece 30.

The second part of the combustion chamber insert 24 is formed by a tube 38 consisting of a perforated sheet and defines the combustion chamber 25, and thus forms the outer wall of the combustion chamber. The tube 38 has openings 40 over its entire periphery and its entire length. One end of the tube 38 is connected via the shoulder 36 with the cap-shaped end piece 30. The encircling shoulder 36 of the cap-shaped end piece supports the tube 38 and thus prevents an axial displacement of the tube 38 with the construction (described below) of the form-fitting connections at the axial ends 28, 29 of the combustion chamber insert 24.

Between the cap-shaped end piece 30 and the tube 38, a dividing wall 39 is arranged, which in this case is constructed as a continuous sheet. The dividing wall 39 separates the solid propellant 26 held in the combustion chamber 25 in axial direction A completely from the interior of the cap-shaped end piece 30. The gas generated from the solid propellant 26 flows via the openings 40 out from the tube 38 firstly into the intermediate space between the peripheral wall 14 and the outer side of the tube 38, from there via the through-flow openings 32 in the cap-shaped end piece 30 to the outflow openings 22 and finally out from the gas generator 10.

It would also be possible to construct one or more overflow openings in the dividing wall 39.

At the second axial end 29 of the combustion chamber insert 24, which is shown in FIG. 1, the end region of the tube 38 is deformed to a V- or bead-shaped depression 44 and is pressed against the inner side of the peripheral wall 14 of the outer housing 12, whereby a flat form fit with the peripheral wall 14 is formed. In the first example embodiment shown in FIG. 1, the depression 44 is directed radially outwards with respect to the tube 38. Either one depression encircling peripherally or several bead-shaped depressions 44 distributed over the periphery can be provided. The second axial end 29 of the combustion chamber insert 24 lies under prestressing in axial and radial direction against the inner side of the peripheral wall 14. The fixing is assisted by the conical tapering of the peripheral wall 14 and the receptacle 45 formed hereby. Further means for fastening the combustion chamber insert 24 on the peripheral wall 14 are not provided.

The assembly of the hybrid gas generator 10 is described below. Firstly, the tube 38 is cut to the desired length, adapted to the length of the outer housing 12. Then the cap-shaped end piece 30 and the tube 38 are assembled to the combustion chamber insert 24. Then the combustion chamber insert 24 is pushed into the outer housing 12 and the first axial end 28 of the combustion chamber insert 24 with the cone-shaped chamfer 34 is pressed into a corresponding receptacle 46 in the outer housing. The chamfer 34 lies flat in the receptacle 46. The first axial end 28 of the combustion chamber insert 24 is connected with a form fit with the outer housing 12 and is fixed in axial and radial direction. Now the open end region of the tube 38 is shaped with a tool, the bead-shaped depression 44 being formed and pressed in the region of the receptacle 45 against the inner side of the peripheral wall 14. The depression 44 lies flat against the peripheral wall 14 and connects the second axial end 29 of the combustion chamber insert 24 in a form fit with the peripheral wall 14. Then the solid propellant 26 and the medium 13 which is under pressure are filled in, and also the ignition unit 16 is inserted.

Figure 3:
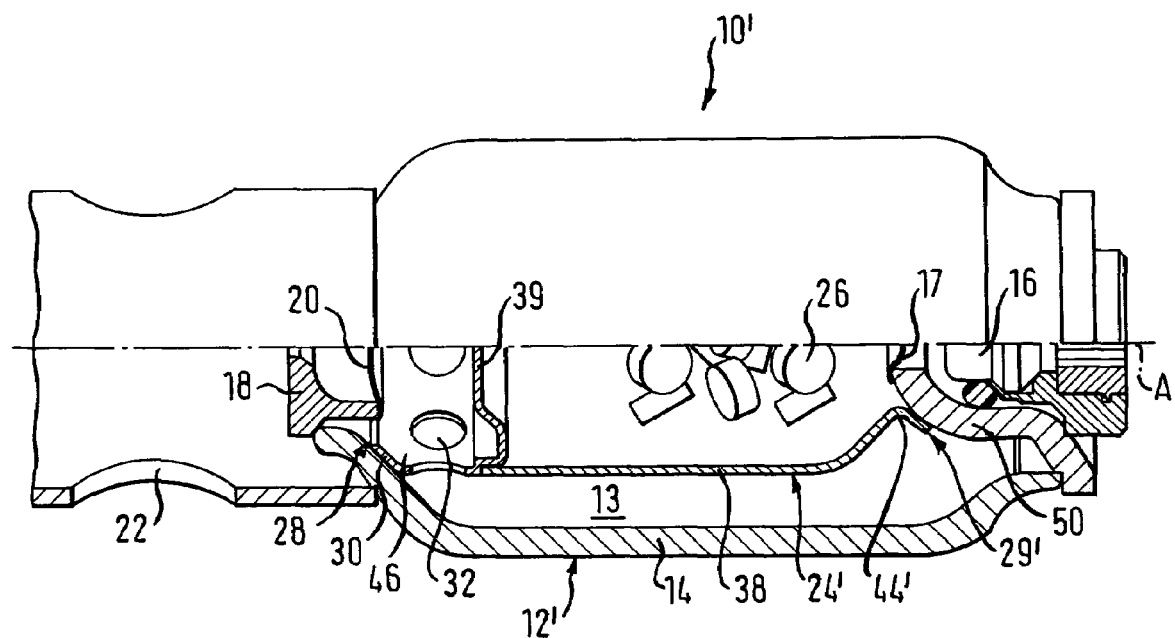
FIG. 3 shows a diagrammatic view, partially in section, of a gas generator according to the invention in accordance with a second embodiment.

In a second embodiment of the invention, which is shown in FIG. 3, in contrast to the first embodiment just described, with the hybrid gas generator 10' the second axial end 29' of the combustion chamber insert 24' does not lie against the inner side of the peripheral wall 14 of the outer housing 12', but rather against a wall 50 of the ignition unit 16, which forms an end face of the outer housing 12'. Otherwise, all the features are present which are described in connection with FIGS. 1 and 2. Here, also, one or more bead-shaped depressions 44' are again provided, by means of which the form fit to the wall 50 is achieved. In this embodiment, the depression 44' is directed radially inwards. The second axial end 29 lies under radial and axial prestressing against the wall 50, which in this region is curved in a concave shape accordingly, in order to assist the fixing.

Preferably, the deformation of the end region of the tube 38 at the second axial end 29' of the combustion chamber insert 24' takes place here before the ignition unit 16 is inserted into the outer housing 12.

Each of the gas generators 10, 10' shown in FIGS. 1 and 3 can be connected in mirror image with a further gas generator, so that a two-stage gas generator is formed. In this case, the outflow openings 22 would serve as common outflow openings for both gas generators.

The combustion chamber insert 24, 24' is fixed at both axial ends 28, 29, 29' in axial and radial direction in the outer housing 12.

Figure 4:
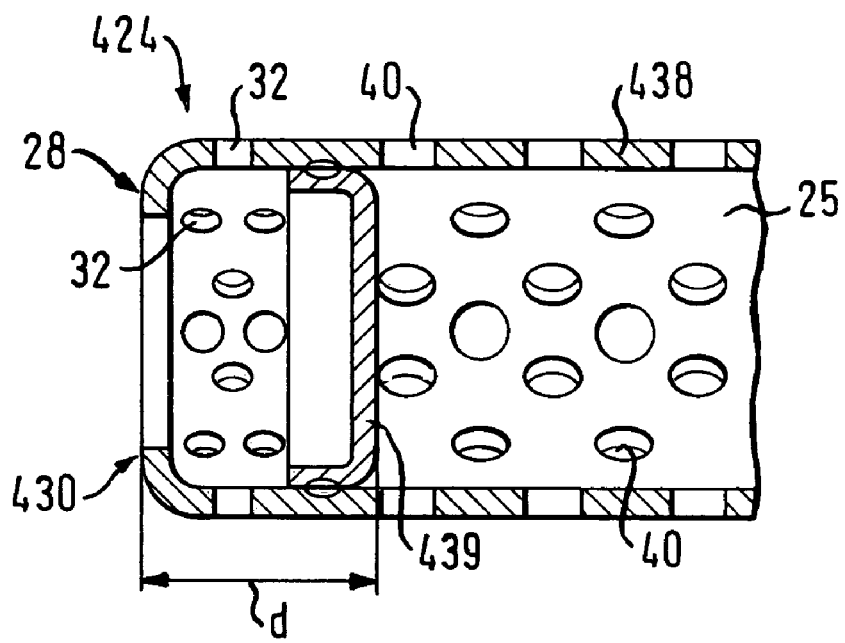
FIG. 4 shows a sectional diagrammatic view of a part of a combustion chamber insert for a gas generator according to the invention in accordance with a third embodiment.

In the embodiment shown in FIG. 4, the cylindrical peripheral edge of the cap-shaped end piece 430 is part of the tube 438 consisting of perforated sheet, surrounding the combustion chamber 25. At a certain distance d from the first axial end 28 of the combustion chamber insert 424, a separating sheet 439 is welded with the inner wall of the tube 438 and separates the combustion chamber 25 from the end piece 430. The through-flow openings 32 are formed through the open end of the tube 438 and also through the openings 40 of the perforated sheet lying in the divided section.

Figure 5:
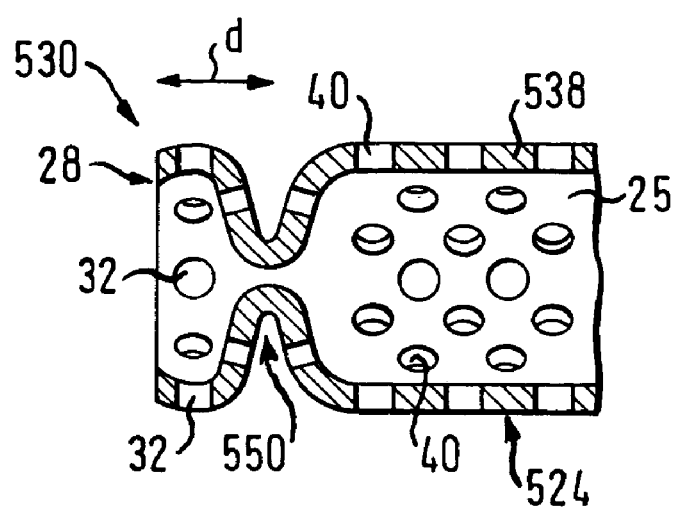
FIG. 5 shows a sectional diagrammatic view of a part of a combustion chamber insert for a gas generator according to the invention in accordance with a fourth embodiment.

In FIG. 5 a further variant is shown, to divide the combustion chamber 25 with respect to the first axial end 28 of the combustion chamber insert 524. In this case, instead of a separating sheet at a certain distance d from the first axial end 28, the tube 538 has a constriction 550, produced for example by compressing the tube wall, by which the solid propellant held in the combustion chamber 25 is kept away from the first axial end 28. The cap-shaped end piece 530 is formed here entirely from the material of the tube 538. Here, also, the through-flow openings 32 are formed through the open end of the tube 538 and also through the openings 40 of the perforated sheet lying in the divided section. This variant is particularly favourably priced, because no additional components have to be used.

The features described in connection with different embodiments can also be combined with each other or exchanged for each other at the discretion of the specialist in the art. The use of the invention is not restricted to hybrid gas generators.

The invention claimed is:

1. A gas generator, comprising:
   an oblong outer housing (12) having an inner wall forming a tapered section, and an elongated combustion chamber insert (24; 24'; 424; 524) with a tubular wall arranged in said outer housing (12), said combustion chamber insert (24; 24'; 424; 524) containing a solid propellant (26), having a first and a second axial end (28, 29; 29') and being held in said outer housing, and
   at least one of the first and second axial ends having a tapered section,
   the geometric shape of the tapered section of the housing and of the tapered section of the combustion chamber insert being adapted to each other so that in the tapered section of the outer housing (12) the tapered section of the tubular wall of said combustion chamber insert (24; 24'; 430; 530) lies against the inner housing wall with a form fit and is fixed at both axial ends (28, 29; 29') in radial and axial directions to said outer housing (12), while the tubular wall is spaced from the outer housing (12) between the axial ends (28, 29, 29') and the combustion chamber insert is prestressed in the axial direction.

2. The gas generator according to claim 1, wherein said wall of said combustion chamber insert (24; 24'; 424; 524) is formed partially by a cap-shaped, axial end piece (30; 430; 530).

3. The gas generator according to claim 2, wherein said cap-shaped end piece (30; 430; 530) has a cylindrical peripheral edge with through-flow openings (32).

4. The gas generator according to claim 2, wherein said cap-shaped end piece (30; 430) has an axial dividing wall (39; 439) to delimit a combustion chamber (25) formed in said combustion chamber insert (24; 24').

5. The gas generator according to claim 1, wherein said first axial end (28) of said combustion chamber insert (24; 24'; 424; 524) tapers at least partially, a receptacle (46) coordinated with a geometric shape of said first axial end (28) is provided in said outer housing, and said first axial end (28) is held and fixed with said form fit in said receptacle (46).

6. The gas generator according to claim 1, wherein said second axial end (29) of said combustion chamber insert (24) is open and lies prestressed against said outer housing (12).

7. The gas generator according to claim 1, wherein said form fit for fixing said second axial end (29; 29') of said combustion chamber insert (24) takes place through a deformation of said second axial end (29; 29') in a state of said combustion chamber insert (24) when inserted in said outer housing.

8. The gas generator according to claim 1, wherein at least one bead-shaped depression (44; 44') is formed at said second axial end (29; 29') of said combustion chamber insert, by means of said depression (44; 44') a form fit is achieved.

9. The gas generator according to claim 1, wherein said axial ends (28, 29; 29') of said combustion chamber insert (24; 24') lie flat against an inner side of a section (14; 50) of said outer housing (12).

10. The gas generator according to claim 1, wherein said combustion chamber insert (24) at its axial ends (28, 29) and an inner side of said outer housing (12) taper conically to form receptacles (45, 46), and said combustion chamber insert (24) is held axially braced between said receptacles (45, 46) in said outer housing (12) and with a form fit in radial direction.

11. A method for assembling of a gas generator, comprising the steps of
   a) providing a gas generator having an oblong outer housing (12) and an elongated combustion chamber insert (24; 24'; 424; 524) for containing a solid propellant (26), with a tubular wall comprising a perforated sheet and having a first and a second axial end (28, 29; 29'), said perforated sheet comprising through holes extending through the sheet,
   b) inserting said combustion chamber insert (24; 24'; 424; 524) into said outer housing (12) and fixing said first axial end (28) thereof by a form fit in radial and axial directions in said outer housing (12) and
   c) deforming said second axial end (29; 29') of said combustion chamber insert (24) to provide a form fit in radial and axial direction to fix said second end (29; 29') in said outer housing (12) and prestressing the combustion chamber insert in radial and axial directions to fix the combustion chamber insert (24) in the outer housing.

12. A hybrid gas generator, comprising:
   an oblong outer housing (12) surrounding a pressure chamber filled with a medium under pressure,
   and an elongated combustion chamber insert (24; 24'; 424; 524) with a tubular wall comprising a perforated sheet,
   the combustion chamber insert (24; 24'; 424; 524) being arranged in said outer housing (12),
   said combustion chamber insert (24; 24'; 424; 524) containing a solid propellant (26), said combustion chamber insert (24; 24'; 424; 524) having a first and a second axial end (28, 29; 29') and being held in said outer housing, and the tubular wall of said combustion chamber insert (24; 24'; 430; 530) being fixed at both axial ends (28, 29; 29') by a form fit in radial and axial directions to said outer housing (12), at least one of the axial ends (28, 29: 29') lying directly against an inner wall of the outer housing (12).

13. A gas generator, comprising:

An oblong outer housing (12) having an inner wall forming a tapered section, and an elongated combustion chamber insert (24; 24'; 424; 524) with a tubular wall arranged in said outer housing (12), said combustion chamber insert (24; 24'; 424; 524) containing a solid propellant (26), having a first and a second axial end (28, 29; 29') and being held in said outer housing, and at least one of the first and second axial ends having a tapered section, the geometric shape of the tapered section of the housing and of the tapered section of the combustion chamber insert being adapted to each other so that in the tapered section of the outer housing (12) the tapered section of the tubular wall of said combustion chamber insert (24; 24'; 430; 530) lies against the inner housing wall with a form fit and is fixed at both axial ends (28, 29; 29') in radial and axial directions to said outer housing (12), and the combustion chamber insert is prestressed in the axial direction without further means for fastening the combustion chamber insert on the peripheral wall being provided.

14. A gas generator, prior to actuation comprising:

an oblong outer housing (12)

and an elongated combustion chamber insert (24; 24'; 424; 524) with a tubular wall comprising a perforated sheet, so that openings (40) are provided along a periphery of the tubular wall, the combustion chamber insert (24; 24'; 424; 524) being arranged in said outer housing (12), said combustion chamber insert (24; 24'; 424; 524) containing a solid propellant (26), said combustion chamber insert (24; 24'; 424; 524) having a first and a second axial end (28, 29; 29') and being held in said outer housing, and the tubular wall of said combustion chamber insert (24; 24'; 430; 530) being fixed at both axial ends (28, 29; 29') by a form fit in radial and axial directions to said outer housing (12).

15. A method for assembling of a gas generator, comprising the steps of:

a) providing a gas generator having an oblong outer housing (12) and an elongated combustion chamber insert (24; 24'; 424; 524) for containing a solid propellant (26), the combustion chamber insert (24; 24'; 424; 524) having a tubular wall comprising a perforated sheet so that openings (40) are provided along a periphery of the tubular wall prior to activation of the gas generator and having a first and a second axial end (28, 29; 29'), b) inserting said combustion chamber insert (24; 24'; 424; 524) into said outer housing (12) and fixing said first axial end (28) thereof by a form fit in radial and axial directions in said outer housing (12) and c) deforming said second axial end (29; 29') of said combustion chamber insert (24) to provide a form fit in radial and axial direction to fix said second end (29; 29') in said outer housing (12) and prestressing the combustion chamber insert in radial and axial directions to fix the combustion chamber insert (24) in the outer housing.

16. A gas generator, prior to actuation comprising:

an oblong outer housing (12)

and an elongated combustion chamber insert (24; 24'; 424; 524) with a tubular wall comprising a perforated sheet, said perforated sheet comprising through holes extending through the sheet, the combustion chamber insert (24; 24'; 424; 524) being arranged in said outer housing (12), said combustion chamber insert (24; 24'; 424; 524) containing a solid propellant (26), said combustion chamber insert (24; 24'; 424; 524) having a first and a second axial end (28, 29; 29') and being held in said outer housing, and the tubular wall of said combustion chamber insert (24; 24'; 430; 530) being fixed at both axial ends (28, 29; 29') by a form fit in radial and axial directions to said outer housing (12).

* * * * *